United States Patent
Lurey et al.

(10) Patent No.: US 11,218,304 B2
(45) Date of Patent: Jan. 4, 2022

(54) SYSTEM AND METHOD FOR DETECTING BREACHED PASSWORDS WITHOUT DISCLOSING IDENTIFIABLE INFORMATION

(71) Applicant: Keeper Security, Inc., Chicago, IL (US)

(72) Inventors: Craig B. Lurey, Chicago, IL (US); Darren S. Guccione, Chicago, IL (US)

(73) Assignee: KEEPER SECURITY, INC., Chicago, IL (US)

( * ) Notice: Subject to any disclaimer, the term of this patent is extended or adjusted under 35 U.S.C. 154(b) by 147 days.

(21) Appl. No.: 16/578,854

(22) Filed: Sep. 23, 2019

(65) Prior Publication Data

US 2021/0091938 A1    Mar. 25, 2021

(51) Int. Cl.
*H04L 9/08* (2006.01)
*H04L 9/32* (2006.01)
*G06F 21/60* (2013.01)

(52) U.S. Cl.
CPC .......... *H04L 9/0863* (2013.01); *G06F 21/602* (2013.01); *H04L 9/0869* (2013.01); *H04L 9/3242* (2013.01)

(58) Field of Classification Search
CPC ... H04L 9/0863; H04L 9/0869; H04L 9/3242; H04L 63/00; H04L 2209/42; H04L 9/0897; H04L 9/3218; H04L 63/14667; H04L 63/083; H04L 63/06; H04L 63/10; H04L 29/06; H04L 63/0421; H04L 63/1466; G06F 21/602; G06F 21/45

See application file for complete search history.

(56) References Cited

U.S. PATENT DOCUMENTS

| | | | |
|---|---|---|---|
| 2003/0200437 A1* | 10/2003 | Oishi | H04L 9/3013 713/175 |
| 2010/0199098 A1* | 8/2010 | King | H04L 9/0866 713/182 |
| 2013/0238496 A1* | 9/2013 | Monster | G06Q 20/06 705/40 |
| 2018/0205757 A1* | 7/2018 | Versteeg | H04L 63/1466 |
| 2018/0288050 A1* | 10/2018 | Chen | H04W 12/08 |
| 2019/0229909 A1* | 7/2019 | Patel | H04L 63/102 |

* cited by examiner

*Primary Examiner* — J. Brant Murphy
(74) *Attorney, Agent, or Firm* — Klintworth & Rozenblat IP LLP

(57) ABSTRACT

Systems and methods for detecting breached user login records in a zero-knowledge architecture. A breach detection module obtains login data that has been breached from breached data sources and service providers. The breached data is hashed with a system key and the breached data hashes are hashed in a hardware security module (HSM) using a hashing method and a non-exportable key. Clients provide user login data that has been hashed using the hashing method by the client device to the breach detection module. The breach detection module hashes the hashed user login data and compares the hashed user login hashes with the hashed breached data hashes and sends a breach alert to the client device if any hashes match.

19 Claims, 7 Drawing Sheets

SYSTEM AND METHOD FOR DETECTING BREACHED PASSWORDS WITHOUT DISCLOSING IDENTIFIABLE INFORMATION

BACKGROUND

The growth of the computing industry has been substantially driven by the continually expanding networking capabilities of computers and services offered by service providers over the Internet. Such growth and expansion of services has also created risks posed by hackers creating an increasing need for more comprehensive access security for given services and data. Service providers have established more rigorous password and authentication processes, which are designed to provide authorized use or access to sensitive data. These improved processes, however, also increase the complexity for entering and accessing the data. As a result of having more rigorous passwords and authentication processes, users can become frustrated when attempting to access services for which they use and/or pay.

One way in which hackers obtain access to users' sensitive data is by attempting to login to user accounts by trying different combinations of usernames and passwords. One way to limit the risk of intrusion is for a user to select a strong password. However, hackers have developed sophisticated tools for generating password and username combinations very quickly. Users have also become prone to using the same or similar passwords and usernames generally weakening otherwise strong passwords. Many of the passwords selected by users have been breached in attacks. Knowing whether a password, or a username, or a given username-password combination has been breached in an attack would help users select username and password combinations that have not already been breached and thus, lower the risk of getting hacked.

SUMMARY

In view of the above, systems and methods are provided to detect whether user login data is the subject of any breaches. In an example system, a network interface may be configured to communicate with a client device and a database of known web breach data. A hardware security module (HSM) includes a non-exportable key, and an HSM storage. The HSM performs a hashing function and a breach detection module. The breach detection module may be configured to receive breached web data elements from breached data providers. The breached web data elements may be hashed using a system key to generate breached web data hashes. The breached web data hashes are hashed in the HSM using the hashing method with the non-exportable key. Each hashed breached web data element may be stored in a hashed breached web database. The breach detection module receives at least one user login data hash. The at least one user login data hash may be received after being processed on the client device using the hashing method and an anonymous identifier from the client device. No information associated with a user of the client device is provided to the breach detection module.

The at least one user login data hash may be hashed in the HSM using the hashing method and the non-exportable key to generate at least one hashed user login data hash for each user login data hash. The breach detection module compares the at least one hashed user login data hash with each of the hashed breached web data elements. A breach notification may be sent to the client device for each hashed user login data hash that matches one of the hashed breached web data elements. The anonymous identifier and each hashed user login data hash that does not match any of the hashed breached web data elements may be stored for later status checks.

In an example computer-implemented method for detecting breached user login data in a zero-knowledge vault, breached web data elements are received from breached data providers. The breached web data elements are hashed using a hashing method with a non-exportable key. The hashed breached web data elements are stored in a hashed breached web database. At least one user login data hash and an anonymous identifier are received from a client device. The at least one user login data hash corresponds to user login data elements processed on the client device using the hashing method. No identifying information associated with a user of the client device is received by the breach detection module.

The at least one user login data hash may be hashed using the hashing method and the non-exportable key to generate at least one hashed user login data hash for each user login data hash. The at least one hashed user login data hash is compared with each of the hashed breached web data elements. A breach notification is sent to the client device for each hashed user login data hash that matches one of the plurality of hashed breached web data elements. The anonymous identifier and each hashed user login data hash that does not match any of the hashed breached web data elements are stored and sent to the client device. A random identifier may be generated and stored for each hashed user login data hash that does not match any of the hashed breached web data element. The random identifier may be sent to the client device.

DETAILED DESCRIPTION

Disclosed below are systems and methods for detecting whether a user's login data has been breached. The user login data that is of primary interest includes usernames, passwords, username-password combinations, and domains. The system can check whether a password and/or username has been breached by using a hash function to generate a first hash based on the user login data at a client device and sending the first hash to a breach detection module, or server, along with a random identifier, referred to in this disclosure as an anonymous identifier. The breach detection module provides the first hash to a hardware security module, which generates a second hash from the first hash using the hash function and a non-exportable key derived and stored in the hardware security module.

The breach detection module repeatedly performs a download of all user login data (e.g. username, password, domain) that has been found to be breached by other service providers. Such breached user login data may be obtained from various service providers that offer services as an ISP and license or sell web or dark web breached data by purchasing or licensing the data from other service providers, such as Amazon, Google, Yahoo!, Equifax, etc. The breach detection module hashes each item of breached login data using a system key, and provides each item of hashed breached user login data to the hardware security module, which generates a hash value for each item of hashed breached user login data using the same hash function and non-exportable key used to generate the second hash of user login data. The breach detection module stores the breached web login data hash along with a corresponding domain from which the original breach was detected.

When the breach detection module has generated the second hash from each user login data item received from the client device, the second hashes are compared with each of the hashes of hashed breached user login data. If any of the second hashes matches one of the hashes of hashed breached login data, the user login data item associated with that second hash is determined to have been breached. If the second hashes do not match any of the hashes of the hashed breached data, then the user login data from the client device has not been breached.

In one example implementation, a random identifier may be generated to anonymously identify user login data that has not been breached. The breach detection module may then send a notification message, the second hash of each item of user login data checked, each corresponding random identifier, and the anonymous identifier.

As used herein, the term "database" shall be understood to include any memory, or data storage system, or any source of stored data including a cloud-based system, and data storage systems controlled by Internet service providers.

Figure 1:
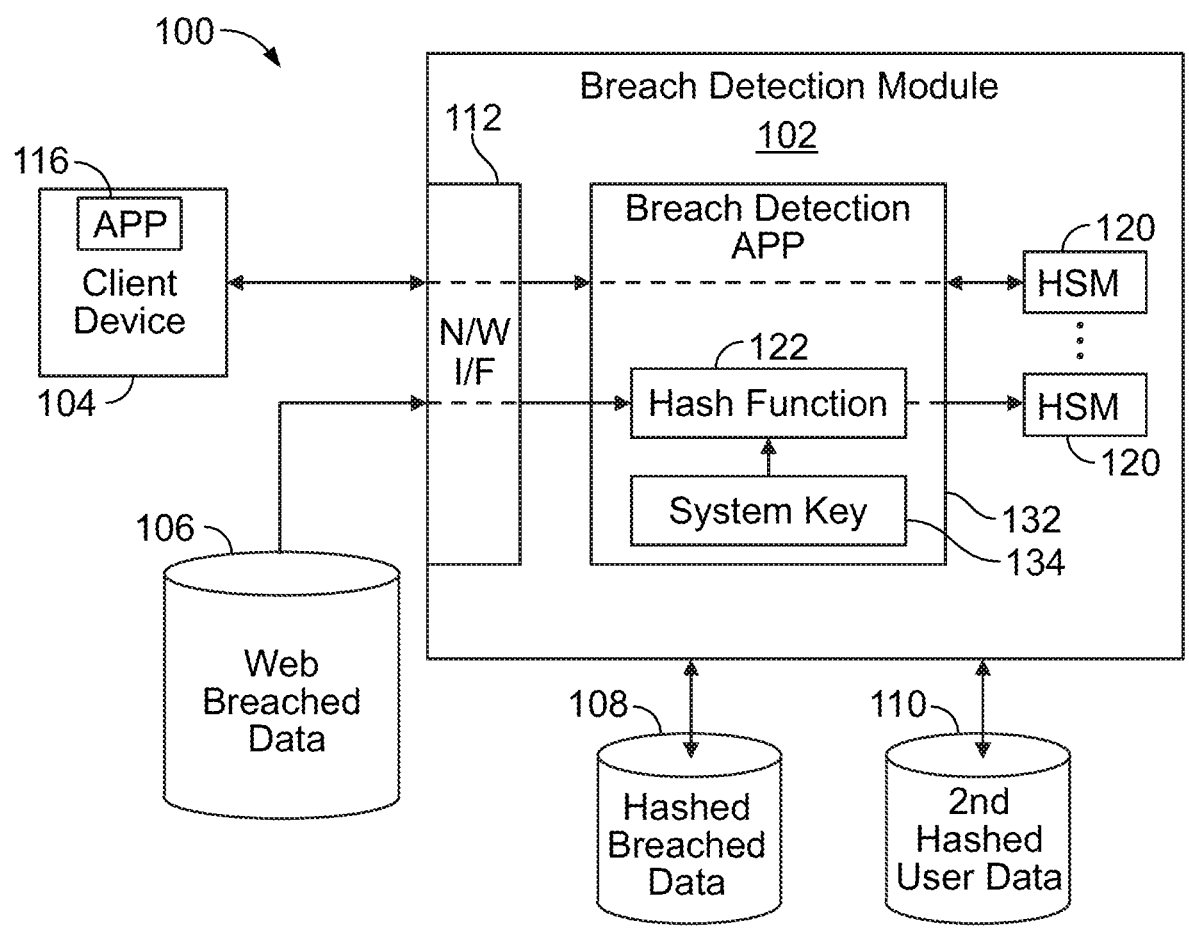
FIG. 1 is a block diagram of an example implementation of a system for detecting a breach of user login data, according to one embodiment.

FIG. 1 is a block diagram of a system 100 for detecting whether user login data has been breached. The system 100 may be configured to detect breaches of any data elements used in authenticating a user of a service, such as for example, usernames, passwords, username-password combinations, and domains. The system 100 determines whether a user's login information has been used in breaches, such as for example, dark web data breaches. If the system 100 identifies a user's password for logging into a service on the Internet as having been used in a breach elsewhere, the user may be advised to use a different password. If a user's password has been breached, the system 100 may check the username-password combination and domain to determine the severity of the breach.

The system 100 may operate as a standalone service to which a user may log in using secure sign-on procedures, examples of which are described in more detail below with reference to FIG. 6. The system 100 may also operate as part of a comprehensive security system that may provide encryption/decryption, user authentication, password management, and other security services. The system 100 may operate using a zero-knowledge architecture. In a zero-knowledge architecture, data encryption and decryption is performed at the device level as opposed to the server level, so that no plain text data is stored by the application, plaintext data is never provided to servers, and, in general, no identifiable information is disclosed to any service provider or outside party. The system 100 may operate as a self-contained, managed, zero-knowledge architecture on a cloud service (such as for example, Amazon AWS) that is physically separate from other security provider components and from any stored user data.

The system 100 includes a breach detection module 102 operating in, or as a server on a data network. The breach detection module 102 communicates via a network interface 112 with a client device 104 and a web breach database 106. The breach detection module 102 includes a hashed web breached login database 108 and a database for storing hashed user login hashes 110. The system 100 includes at least one hardware security module (HSM) 120 configured to perform a hashing method and to store non-exportable keys. The breach detection module 102 also includes a breach detection application 132 comprised of programmed software code to carry out the breach detection functions. One function performed by the breach detection application 132 may be a hash function 122 for generating hash values for the breached web login data using a system key 134.

The breach detection module 102 may be configured to operate physically separate from other entities in a variety of ways. In this description, it shall be assumed that the breach detection module 102 as shown in FIG. 1 operates as a server physically separate from other applications or functions.

The HSM 120 may be physically separate from the hardware of the breach detection module 102 and accessible by the breach detection module 102 via a dedicated HSM interface. The example shown in FIG. 1 includes multiple HSMs. Any number of HSMs may be used. The HSM stores a non-exportable key in HSM storage, which may be used to perform a hashing function.

The breach detection module 102 includes a processor and storage for executing software, such as a breach detection application. The breach detection application may be configured to communicate with users at client devices for detecting whether the user's login records have been breached or are at risk. The breach detection application may initiate the process of detecting breaches by authenticating a user and requesting information. The authentication of the user may be initiated by a direct request from the user for services provided by the system 100. In some implementations, the user may attempt to login to an Internet service provider (ISP) for a service provider enterprise, such as a health insurance provider. The system 100 may be configured to sense the user's attempt to authenticate on the Internet service provider and initiate the user authentication on the breach detection system 100. The breach detection system 100 may then request the user's usernames and passwords to determine if they have been breached. The breach check may be limited to the username and/or password being used to log in to the health insurance provider ISP. The breach check may also be performed on all of the passwords and usernames on the user's client device 104.

The breach detection module 102 in FIG. 1 may be configured to download breached web data elements, such as for example, domains, usernames and passwords that have been breached. The breached web data elements may be provided by various service providers that offer services as an ISP and license or sell web or dark web breached data. The breached web data elements are hashed in the HSM using the hashing method with the non-exportable key. In an example implementation, the hashing method is the HMAC_SAH512 hash method. The hashed breached web data elements are stored in a hashed breached web database 108.

Once the user has been authenticated, a client-side breach detection application 116 associated with the breach detection system 100 may hash the user's login data elements used by the user to access services and store the user login data hashes. The client-side application 116 may use the same hashing method used by the HSM 120. In an example implementation, the hashing method is the HMAC_SHA512 hash method. The application 116 may also include an anonymizing function, which may be a random number generator, to serve as an anonymous identifier of the user by the breach detection module 102. The client device 104 then sends the user login data hashes and anonymous identifier to the breach detection module 102.

The breach detection module 102 receives user login data hash or hashes and provides the user login data hashes to the HSM 120. The HSM 120 hashes the at least one user login data hash using the hashing method and the non-exportable key to generate at least one hashed user login data hash for each user login data hash.

The breach detection module 102 compares the at least one hashed user login data hash with each of the hashed breached web data elements. The comparison may be between a user's hashed password hash and the hashed breached web passwords, the user's hashed username hash and the hashed breached web usernames, or the user's hashed username-password combination hash and the hashed breached web username-password combinations.

If the comparison results in a match between the hashed user login data hashes and the hashed breached web data, the user is sent a notification of a breach. If the comparison does not result in a match, a random identifier may be generated and sent to the user with the anonymous identifier and the hashed user login data hash that was checked. The random identifier may be generated using an anonymizer or random identifier generator. The randomness provides the identifying function of the random identifier with anonymity so that the random identifier cannot be associated with any user or user data.

Once a login data element has been associated with a random identifier, the client device 104 may subsequently check the login data element associated with the random identifier by requesting the breach detection module 102 to determine if the associated login data element has been breached. The request may be sent to the breach detection module 102 by providing the random identifier, thereby limiting the exposure of the user login data element hashes on the data network.

In an example implementation, the breach detection module 102 may download and hash breached web data that had not been found previously on a repeated basis. The breach detection module 102 may then check the new hashed breached web data against the hashed user login data hashes associated with all of the random identifiers, or hashes that had not previously matched any breached web data hashes. If new matches are found, the breach detection module queues a breach alert message for the random identifier associated with the matched hashed user login data hash. The queued message may be sent to the user at the client device upon request by the client device 104.

Figure 2:
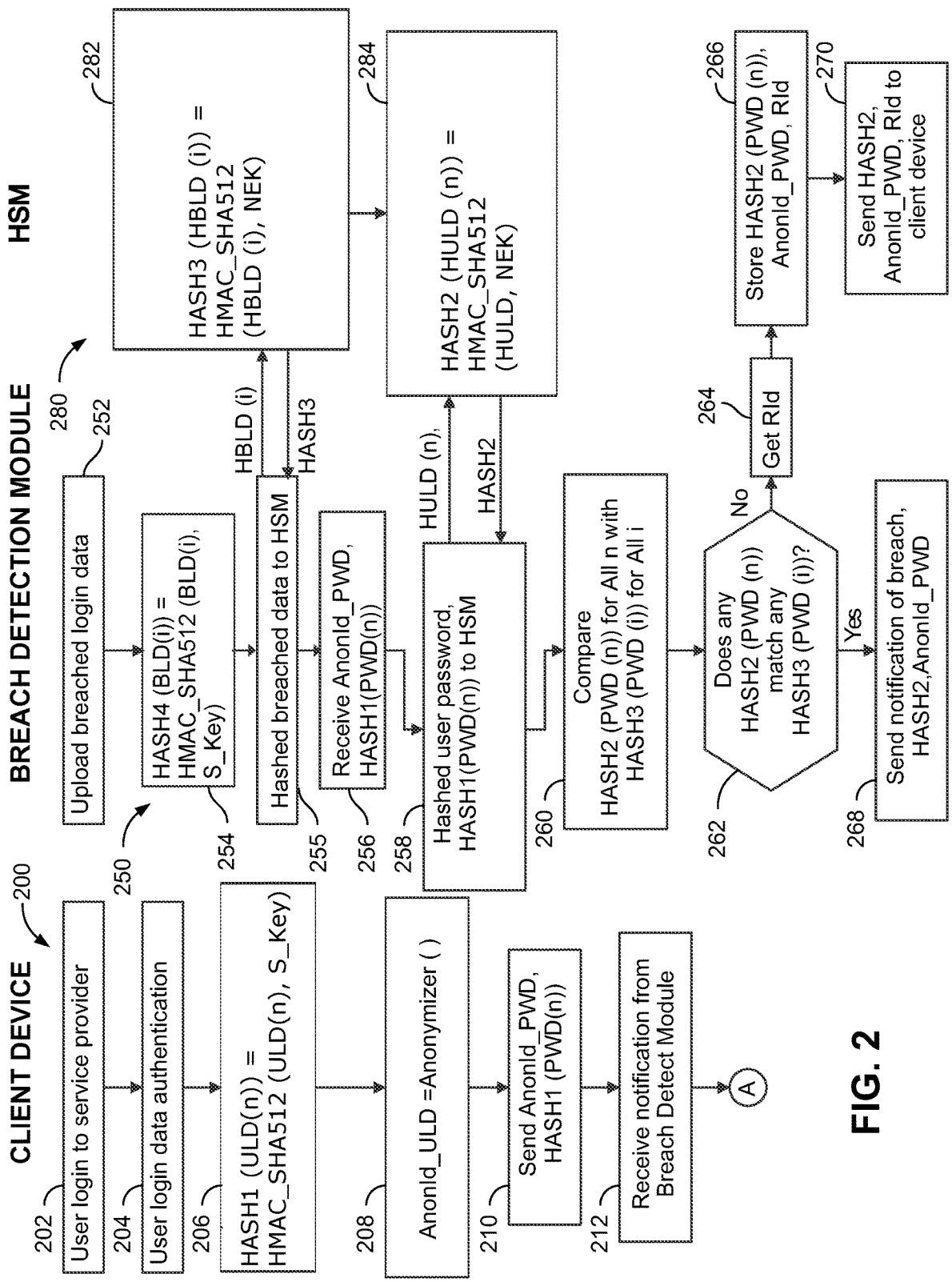
FIG. 2 is a flow diagram illustrating operation of a method for detecting breached user login data, according to one embodiment.

FIG. 2 is a flow diagram of an example implementation of a method for detecting a breached user login data element in a zero-knowledge vault. Reference to FIG. 1 is made for hardware components in the description. The flow diagram in FIG. 2 illustrates steps performed by the client device 104 at 200, the breach detection module 104 at 250 and the HSM 120 at 280. The system for detecting breached user login data may be part of a comprehensive security system that a user may use on the client device 104. Features of the security system may be provided by cloud services, servers, or other data network resources that communicate with the client device 104 via an application ("app") executing on the client device 104. The app provides the user with access to features of the security system, including the detection of breached user login data.

The detection of breached user login data may begin when the user attempts to access a service provider as shown at step 202 by, for example, logging into the service. In one example, the user may be attempting to access a user account on the service provider using login data such as, for example, a username and password. The attempted login may be sensed by the system for detecting breached user login data, which may initiate a user login data authentication on the security system at step 204. The client device 104 may store user login data in a vault as encrypted user login data. The client device 104 may decrypt the encrypted user login data. At step 206, the decrypted data is hashed using a hash method, such as for example, the HMAC_SHA512 method, a known standard method for hashing data. The hash of the decrypted user login data may be performed using a system key, which may be a secret data value added as input to the user login data being hashed. In an example implementation, the system key is known as a "pepper," which may be a password or other type of string of alphanumeric values. The secret input for hashing data that is not performed using the HSM (as described below) shall be referred to as a "system key" or "pepper."

The hashing of the user login data, which in an example implementation includes a password ("PWD"), a username ("USR"), and a username-password combination ("UP"), may be expressed in step 206 as HASH1(ULD)=HMAC_512(ULD(n), S_Key). For each user login data element, HASH1 may be performed as follows:

HASH1(PWD(n))=HMAC_SHA512(ULD.PWD(n), S_Key)
HASH1(USR(n))=HMAC_SHA512(ULD.USR(n), S_Key)
HASH1(UP(n))=HMAC_SHA512(ULD.UP(n), S_Key)

where,
  ULD is user login data.
  PWD is the password component of the user login data.
  USR is the username component of the user login data.
  UP is the username-password combination of the user login data.
  n=number of user login data items having the password, username, and username-password elements stored in the user's vault.
  HASH1 is a hash value generated by the hashing method based on the indicated data elements (PWD, USR, or UP).
  S_Key is the system key or pepper used as input to the hash function.

It is noted that the illustrated pseudo-code for the user login data is only an example for purposes of clarity in the description. The user login data may be provided in any suitable form. In addition, while only the password, username, and username-password combination are shown as examples of user login data, other data elements may be included and checked for breaches as well. For example, domains may be checked for breaches and may thus be included in the user login data.

At step 208, the client-side application 116 generates anonymous identifiers (AnonId(ULD)) using an anonymizer function. For each user login data element, the anonymizer function performs as follows:

AnonId_PWD=Anonymizer( )
AnonId_USR=Anonymizer( )
AnonId_UP=Anonymizer( )

The anonymizer function generates identifiers having values, which may be randomly generated values, that have no association with any information related to the user of the client device. The anonymizer may generate an anonymous identifier for each data element included in the user login data. At step 210, the client device 104 sends the HASH1 value or values and anonymous identifier for the corresponding user login data element to the breach detection module 102. In the example illustrated in FIG. 2, the HASH1 value for the user's password or passwords is sent to the breach detection module 102. However, the HASH1 value for any of the other user login data elements, or for all of the user login data elements, with corresponding anonymous identifiers may be sent as well.

The breach detection module 104 may repeatedly perform a search for any web data used in login attempts that has been breached. Dark web breach data, which may include millions or billions of passwords, usernames, username-password combinations, and domains, may be provided to the breach detection module at step 252. The breached login data received at the breach detection module 102 may be hashed using the same hash function and the same system key used to generate the HASH1 values from the user login data. In an example implementation, the client device 104 and the breach detection module 102 may be configured to use the same system key in performing the same hash function. In some implementations, a system key, or password, may be designated for use with a hash function on all network devices (servers, computers, etc.) used in the security system.

The hashing of the breached login data, which in an example implementation includes a password ("PWD"), a username ("USR"), and a username-password combination ("UP"), may be expressed in step 254 as HASH4 (BLD)=HMAC_512(BLD(n), S_Key). For each user login data element, HASH4 may be performed as follows:

HASH4(PWD(i))=HMAC_SHA512(BLD.PWD(i), S_Key)
HASH4(USR(i))=HMAC_SHA512(BLD.USR(i), S_Key)
HASH4(UP(i))=HMAC_SHA512(BLD.UP(i), S_Key)

where,
BLD is breached login data.
PWD is the password component of the user login data.
USR is the username component of the user login data.
UP is the username-password combination of the user login data.
i=number of breached login data items, which may include passwords, usernames, and username-password combination elements retrieved from breach data sources.
HASH4 is a hash value generated by the hashing method based on the indicated data elements (PWD, USR, or UP).
S_Key is the system key or pepper used as input to the hash function not performed by the HSM. The S_Key used to generate the HASH4 value is the same value as the S_Key used to generate the HASH1 value in the client device.

At step 255, the HASH4 values generated at step 254 are provided to the HSM 120 (in FIG. 1) to hash the hashed values of the breached login data. At step 282, the HSM hashes the hashed breached login data using HASH3 (HBLD (i))=HMAC_SHA512 (HBLD (i), NEK), which may be expressed for each of the login data types as the following:

HASH3 (PWD(i))=HMAC_SHA512 (HBLD.PWD(i), NEK)
HASH3 (USR(i))=HMAC_SHA512 (HBLD.USR(i), NEK)
HASH3 (UP(i))=HMAC_SHA512 (HBLD.UP(i), NEK)

where,
HBLD is hashed breached web data hash, or HASH4 values.
PWD is the password component of the hashed breached login data.
USR is the username component of the hashed breached login data.
UP is the username-password combination of the hashed breached login data.
i=number of breached login data items having the password, username, and username-password elements retrieved in the dark web breached data.
HASH3 is a hash value generated by the hashing method based on the indicated data elements (password, username, username-password), which have been hashed using the system key.
NEK is a non-exportable key generated for the implementation of the HSM 120 for use in hashing HASH4 values to generate the HASH3 values.

The HSM 120 stores the hashed values (HASH3) in the hashed breached web database 108 (in FIG. 1). The HASH3 values may be made accessible by the breach detection module as shown by the transfer of HASH3 data in FIG. 3.

At step 256, the breach detection module receives the user login data hashes from the client device along with the corresponding anonymous identifiers. At step 258, the user login data hashes are provided to the HSM to hash the user login data hashes as shown in step 284. In the illustrated example, the data provided to the HSM is hashed passwords. However, any or all of the hashed user login data may be provided to the HSM. The hash of the user login data hashes is performed using HASH2 (HULD (n))=HMAC_SHA512 (HULD, NEK), which may be expressed for each of the login data types as the following:

HASH2(PWD (n))=HMAC_SHA512(HULD.PWD(n), NEK)
HASH2(USR(n))=HMAC_SHA512(HULD.USR(n), NEK)
HASH2(UP(n))=HMAC_SHA512(HULD.UP(n), NEK)

where,
HULD is hashed user login data, or HASH1 values.
PWD is the password component of the hashed user login data.
USR is the username component of the hashed user login data.
UP is the username-password combination of the hashed user login data.
n=number of user login data items having the password, username, and username-password elements received from the client.
HASH2 is a hash value generated by the hashing method based on the indicated data elements (password, username, username-password).

NEK is a non-exportable key generated for the implementation of the HSM 120 for use in hashing HASH1 values to generate the HASH2 values.

At step 260, the breach detection module compares each hashed user login data hash, or HASH2 value, with each hashed breached web data hash, or HASH3 value. Step 260 and decision block 262 illustrate an example in which the password is the data element being compared. At decision block 262, the comparison of HASH3 (PWD(i)) for all i and HASH2 (PWD(n)) for all n is checked for a match. If there is a match (along flow path TES), a breach alert may be sent at step 268 to the client device with the HASH2 and the anonymous identifier corresponding to the breached password. If no match was found (along flow path 'NO'), the breach detection module generates a random identifier (RId) at step 264. At step 266, each un-breached HASH2 value is stored along with its corresponding random identifier and anonymous identifier. At step 270, the un-breached HASH2 value, its corresponding random identifier, and anonymous identifier are sent to the client device.

At step 212, the client device receives the notification from the breach detection module. The client device then may take appropriate action if a breach was detected. For example, if a breached password was detected, the process may be repeated for the username, or the username-password combination to determine a level of severity of the breach. An example of this method is described below with reference to FIG. 4. The client device may also warn the user of the breach and recommend the password be changed.

Figure 3:
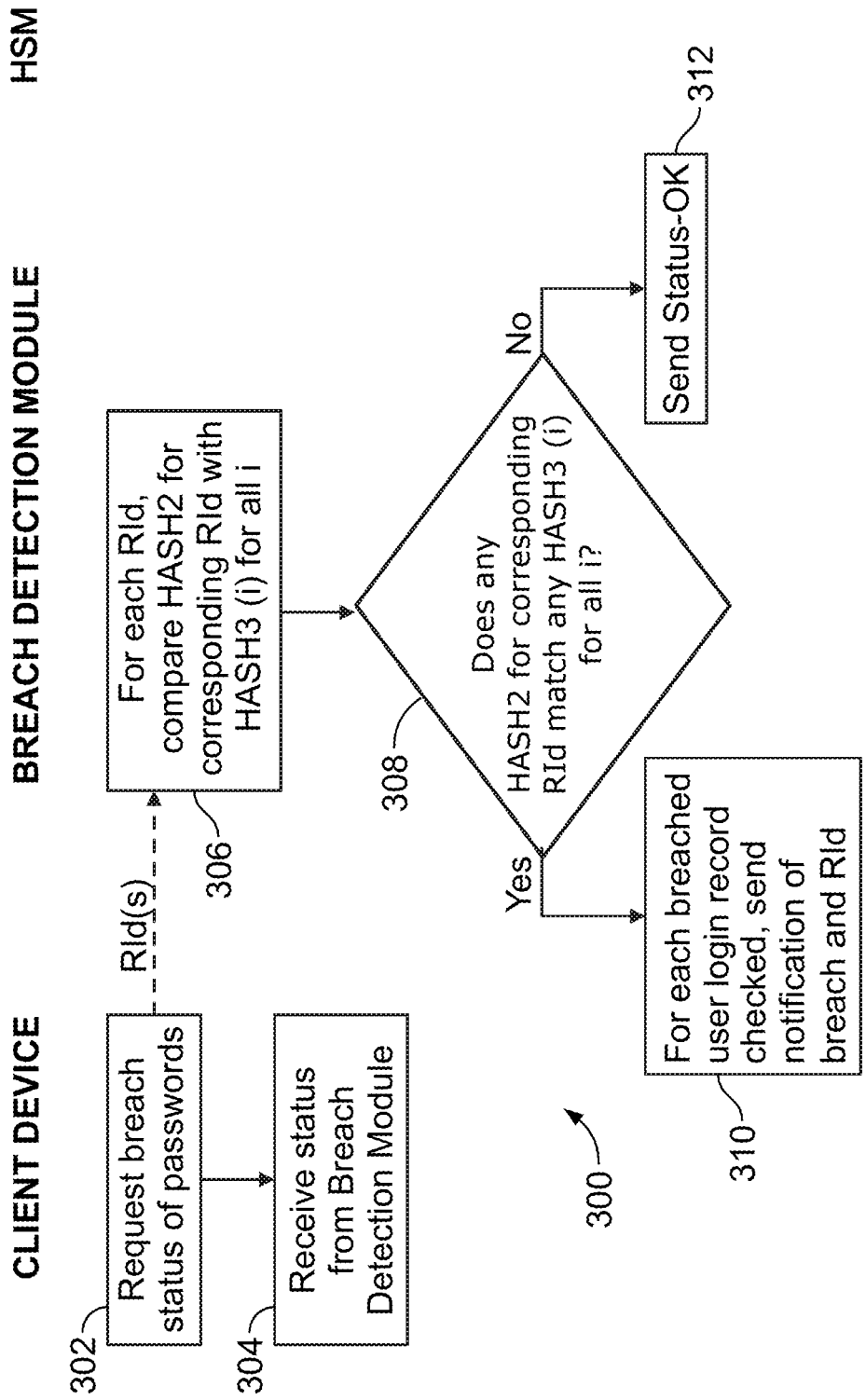
FIG. 3 is a flow diagram illustrating operation of a method for detecting whether a user's login record is breached, according to one embodiment.

FIG. 3 is a flow diagram illustrating operation of an example method for requesting the breach status of a user login record from the breach detection module after a user login record has been verified as un-breached and has received a random identifier. At step 302, the client device sends a request for the breach status of a specific login record, a password, for example. The password in question has been determined previously to be un-breached, or relatively safe to use, and therefore has been associated with a random identifier. The client device may send the associated random identifier to the breach detection module, but not the password or even its HASH1 value, thereby minimizing the extent to which the password and/or associated hash values is communicated on the data network. At step 306, the breach detection module receives the request and random identifier and compares the HASH2 for the random identifier with each hashed breached password in the breached web database 108. It is noted that the breached web database may be repeatedly updated, so even if the user password being checked may have been found to be un-breached in a previous check, it may have subsequently been breached. In this way, user login data values may be checked to determine if the use of the values elsewhere has resulted in a breach making it less safe to use as user login data.

Decision block 308 tests for a match between the HASH2 for the random identifier provided and the HASH3 for all i. If a match is found (along flow path 'YES'), at step 310, a status notification indicating a breach may be sent to the client device along with the associated random identifier. If no match was found at decision block 308, a status notification reflecting no breach was found may be sent to the client device at step 312. At step 304, the client device receives the status notification from the breach detection module and takes the appropriate action.

In some implementations, the user's login data may be checked by the breach detection module in the background as new breached web data is uploaded. The steps in FIG. 3 may be performed without having been requested by the client device. If the breach detection module determines that user login data is breached based on new breached web data, a message may be queued for the user and sent to the user on the next request for breach status by the user.

Figure 4:
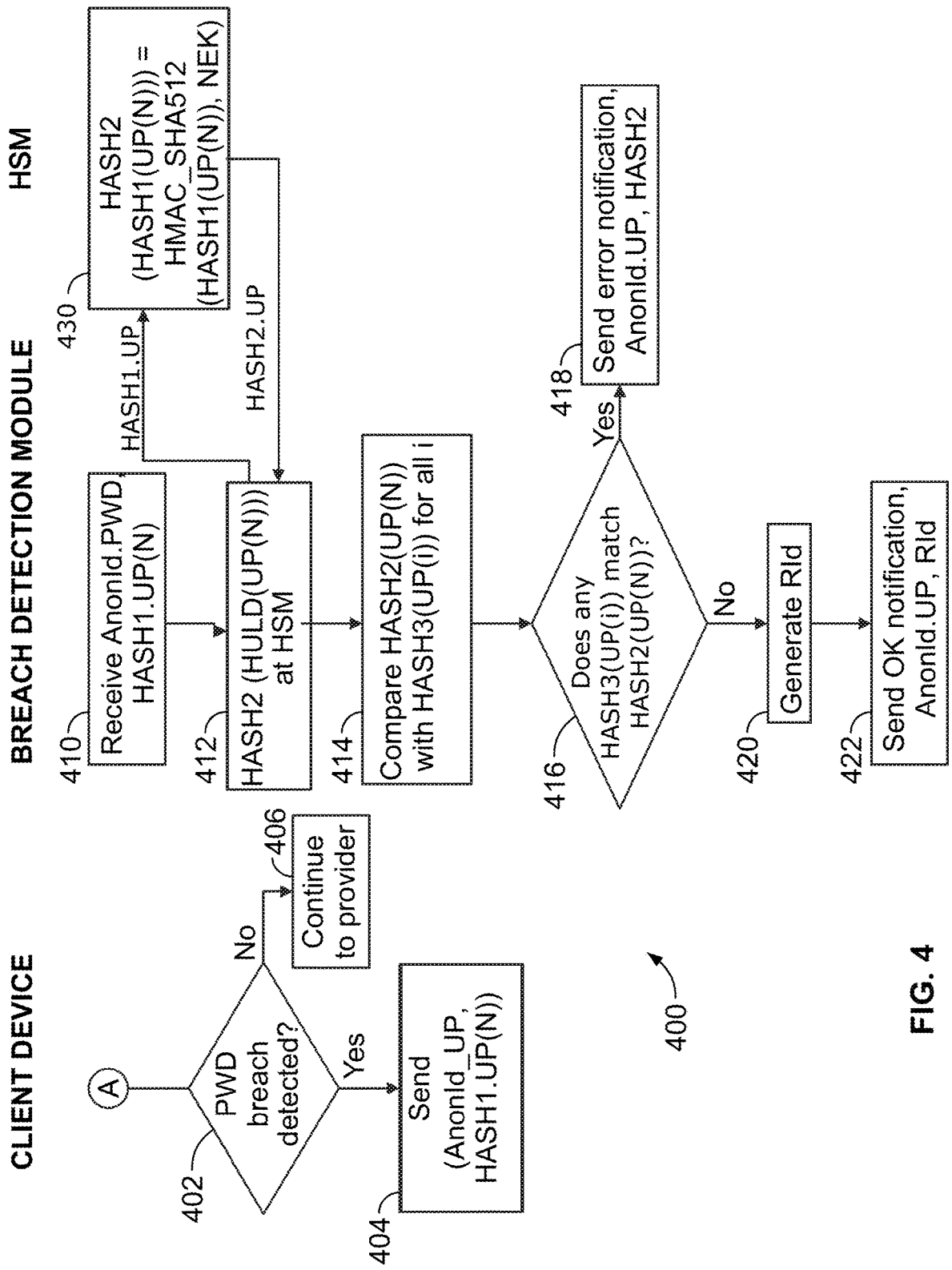
FIG. 4 is a flow diagram illustrating operation of a method for detecting whether a username and password combination has been breached after detecting a breach of the password, according to one embodiment.

FIG. 4 is a flow diagram of a method for checking a user login data element if another has been found to be breached. In the example shown in FIG. 4, a check for a breached password is performed at decision block 402 after having performed the breach detection method in FIG. 1. If a password breach is not found (along flow path 'NO'), the client device may continue with the login at the service provider. If a password breach is detected (along flow path TES), the client device sends the anonymous identifier for the username-password and the HASH1 value for the username-password corresponding to the breached password at step 404. At step 404, the HASH1 value sent is for the username-password combination for n=N, which represents the username-password combination corresponding to the password found breached by performing the method illustrated in FIG. 1.

At step 410, the breach detection module receives the HASH1 value and anonymous identifier from the client device and provides the HASH1(UP(N)) to the HSM at step 412. At step 430, the HSM performs the hashing function of HASH1(UP(N)) using the non-exportable key (NEK) to obtain the HASH2(UP(N)). At step 414, the breach detection module compares the HASH2(UP(N)) with the HASH3(UP (i)) of the breached login data. At decision block 416, the breach detection module determines if HASH2(UP(N)) matches any of the breached login data username-passwords. If no match was found (along flow path 'NO'), a random identifier (RId) may be generated for the username-password combination for n=N at step 420. At step 422, a status notification may be sent to the client device along with the anonymous identifier and the random identifier. If a match was found at decision block 416, a breach alert may be sent to the client device at step 418 along with the anonymous identifier and the HASH1 of the breached username-password combination.

Figure 5:
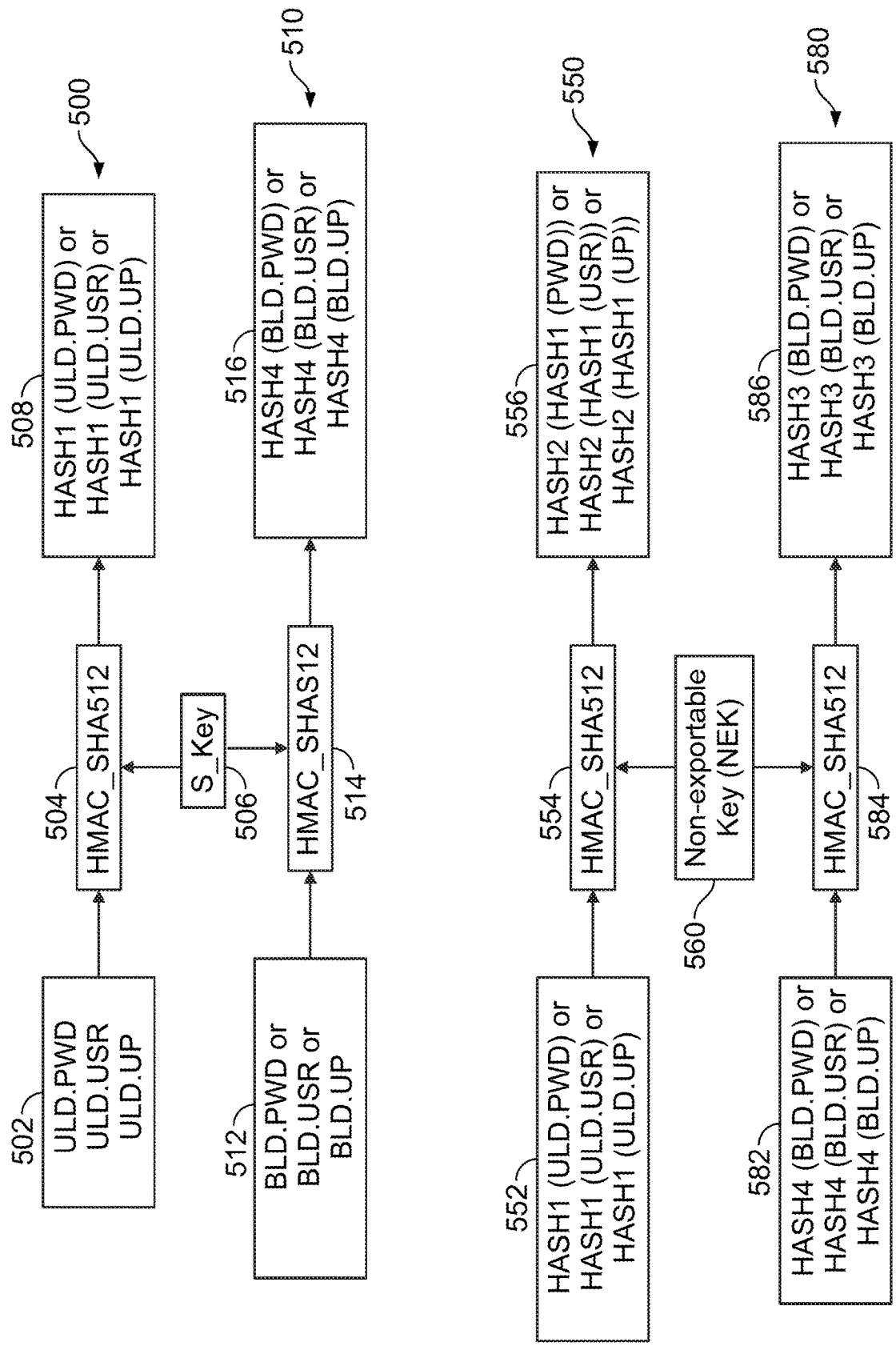
FIG. 5 is a flow diagram illustrating the hash matching process performed by the hardware security module, according to one embodiment.

FIG. 5 includes flow diagrams illustrating the hashing method performed by the client device and the HSM for the three hashes used in the breach detection. The flow diagram 500 for obtaining the HASH1 values includes receiving the user login data 502 and hashing the user login data with the hashing method 504 using a system key ("S_Key") 506 to generate the HASH1 values indicated at 508. The flow diagram 510 for obtaining the HASH4 values includes receiving the breached web login data 512 and hashing the breached web login data with the hashing method 514 using the system key 506 to generate the HASH4 values indicated at 516.

The flow diagram 550 for obtaining the HASH2 values includes receiving the user login data hashes 552, which are the HASH1 values generated using the method illustrated by flow diagram 500. The user login data hashes, HASH1 values, are processed using the hashing method 554 and the non-exportable key 560 to generate the HASH2 values at 556. The flow diagram 580 for obtaining the HASH3 values includes receiving the breached login data hashes 582, which are the HASH4 values generated using the method illustrated by the flow diagram 550. The breached web login data hashes, HASH4 values, are processed using the hashing method 584 and the non-exportable key 560 to generate the HASH3 values at 586. It is noted that the hashing methods 504, 514, 554, 584 are the same. In an example implementation, the hashing method used is the HMAC_SHA512 method, which is well known in the art. Other methods may be used depending on the strength of security desired. The system key 506 used for generating the HASH4 and HASH1 values may be the same key for generating the HASH4 and HASH1 values. The non-exportable key 560 used by the hashing methods in the HSMs may also be the same value for generating the HASH2 and HASH3 values.

Figure 6:
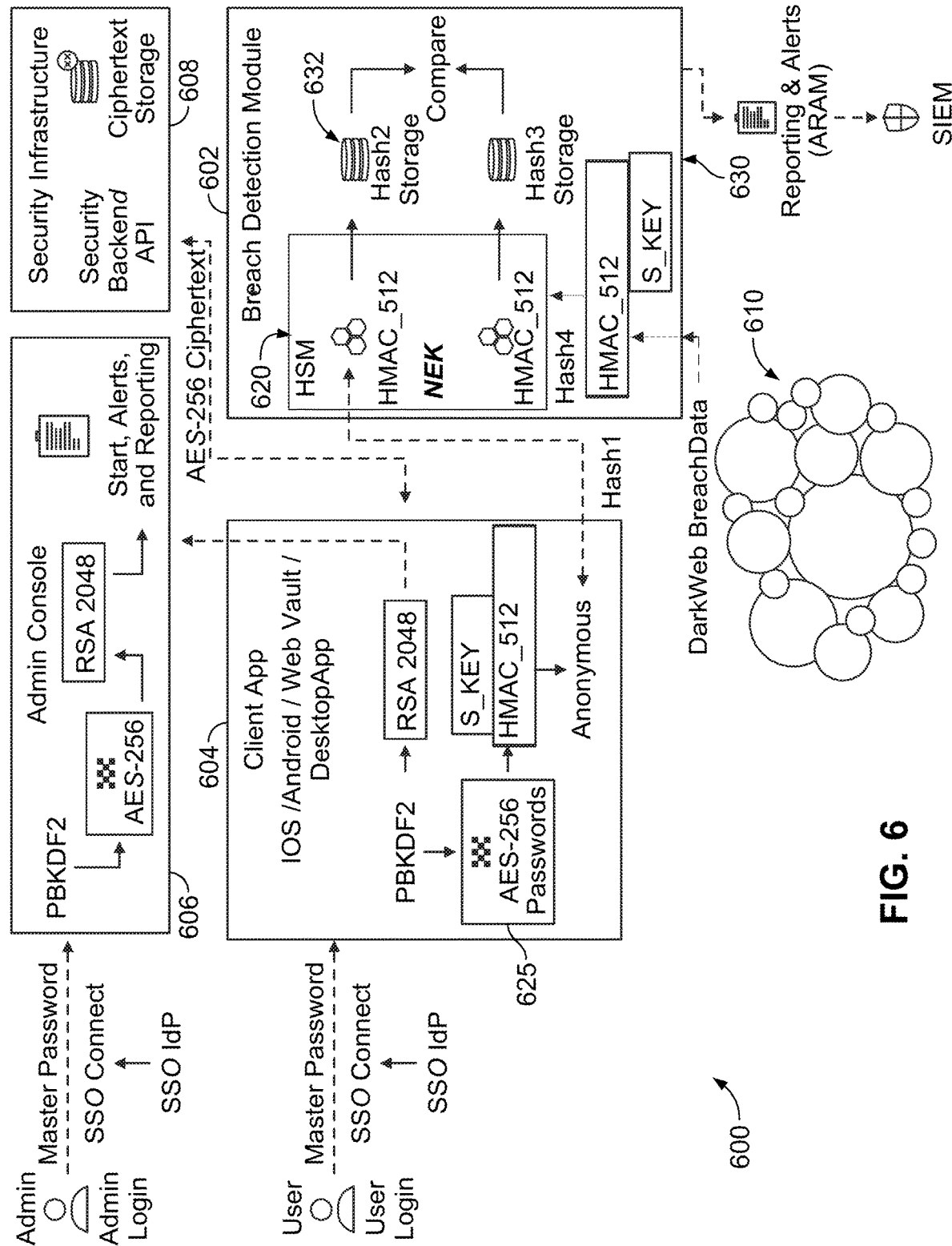
FIG. 6 is block diagram of another example implementation of a system for detecting a breach of user login data, according to one embodiment.

FIG. 6 is a schematic diagram of another example system for detecting breached user login data operating in a comprehensive enterprise security system 600. The system 600 includes a breach detection server 602, a client-side application 604 operating on a client device by USER, a security system backend 608, and administrator console 606 for operation by and ADMIN.

The ADMIN may perform administrative and management functions for the security system via the admin console 606. The security system may encrypt and decrypt data and provide for secure storage for the user's data. The ADMIN is provided with a master password to perform a single-sign-on connection to the admin console 606. In the example in FIG. 6, the single-sign-on (SSO) connection may be facilitated by an identity provider, in which a master password is auto-generated by the SSO software. Once connected to the admin console 606, the ADMIN may use the master password to generate a password-based key using the password based key derivation function (PBKDF2, for example). The key may then be used to access encrypted data, such as data stored as AES-256 encrypted data. The admin console 606 may also generate RSA private and public key pairs to communicate reports, alerts, messages, etc., and for communicating encrypted data with the client application 604.

The USER may login to the client application 604 using a similar SSO connection using a master password. The master password is used to generate a data key to decrypt the encrypted user login data stored in the AES-256 password vault 625. The decrypted passwords (or user login data) may be hashed using a hashing method, such as for example, the HMAC_SHA512, and a system key, or S_Key. The hash value generated is the HASH1 value for the decrypted password. An anonymous identifier may then be generated and sent with the HASH1 value to the breach detection module 602. It is noted that the system shown in FIG. 6 detects breaches in passwords, however, breaches of other user login data may be detected as well according to examples described with reference to FIGS. 1-5.

The breach detection module 602 receives the HASH1 value and anonymous identifier at the HSM 620. Using the HMAC_SHA512 method and the non-exportable key, the HASH1 value is hashed to generate the HASH2 value. The breach detection module 602 also receives the breached web data, or dark web breach data 610. The dark web breach data is hashed outside the HSM 620 first using the HMAC_SHA512 methods and the special key, S_Key, to generate a HASH4 value. The HASH4 value is provided to the HSM 620 and hashed using the non-exportable key and the HMAC_SHA512 method to generate a HASH3 value. The breach detection module 602 compares the HASH2 value with the HASH3 value. If the values match, a breach alert is sent to the client device.

In the system shown in FIG. 6, the breach detection module 602 is physically separated from the rest of the security system infrastructure. The security infrastructure in FIG. 6 may be used to store encrypted data as ciphertext for the user of the security system. The ciphertext may include encrypted anonymous identifiers and random identifiers (RIds), which are generated for user login data that has been found not to have been breached using the breach detection module 602. The RIds may be unencrypted by the user with the user's data key, which may be used to encrypt and decrypt other types of data made secure by the security system. Decryption of the RIds may be performed in the client device, and in some implementations, exclusively in the client device.

Figure 7:
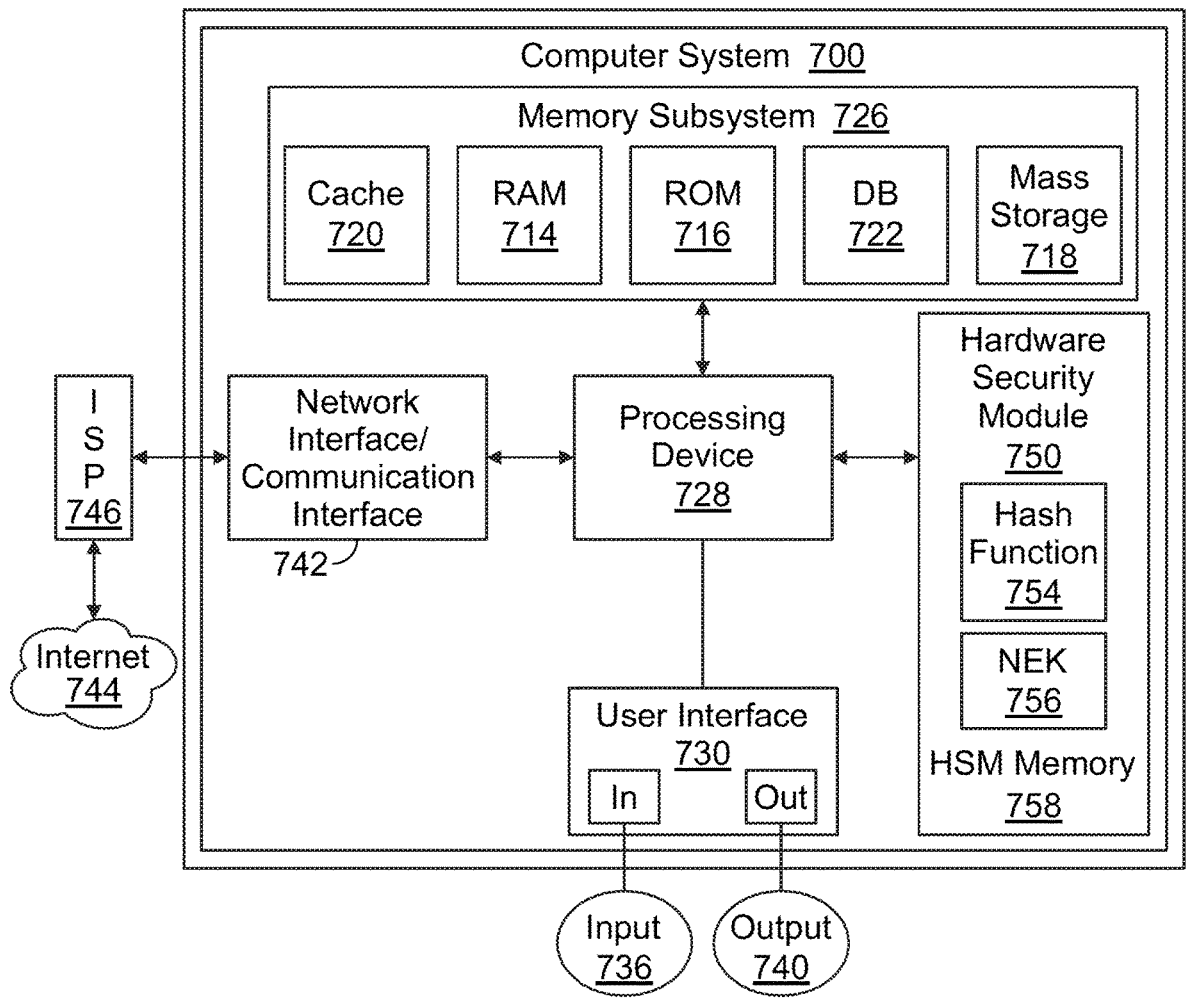
FIG. 7 is a block diagram of an example computer system that may be used in example implementations of a breach detection system.

FIG. 7 is a high-level hardware block diagram of a computer system 700 that may be used to execute software or logic to implement the breach detection module or server 102 (in FIG. 1). The computer 700 may be any suitable computer of the type used to operate as a server on the Internet and may include various hardware components, such as RAM 714, ROM 716, a mass storage system 718 (such as a hard disk, or solid state drive, or other similar mass storage system), cache memory 720, database storage 722, and the like (also referred to as "memory subsystem 726"). The computer 700 may include any suitable processing device 728, such as a computer, microprocessor, RISC processor (reduced instruction set computer), CISC processor (complex instruction set computer), mainframe computer, work station, single-chip computer, distributed processor, controller, microcontroller, discrete logic computer, and the like, as is known in the art.

The memory subsystem 726 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. The computer system 700 may execute machine instructions configured to perform the functions of the breach detection system described with reference to FIGS. 1-6. The machine instructions for the breach detection system may be stored in the memory subsystem 726.

The computer 700 in FIG. 7 may also include a hardware security module (HSM) 750 described above with reference to FIGS. 1-6. The HSM 750 includes hardware and/or software configured to perform a hash function 754 and a non-exportable key (NEK) 756 used by the hash function 754. The hash function 754 may be stored in HSM memory 758 software. The NEK 756 may also be stored in the HSM memory 758 in a manner that prohibits its access by entities external to the HSM module 750.

A user or system interface 730 may be coupled to the computer 700 and may include various input devices 536, such as switches selectable by the system manager and/or a keyboard. The user interface also may include suitable output devices 740, such as an LCD display, a CRT, various LED indicators, a printer, and/or a speech output device, as is known in the art. It is noted that the user interface 730 may be configured to prohibit any user access to the data stored in the HSM 750.

To facilitate communication between the computer 500 and external sources, a communication interface 742 may be operatively coupled to the computer system. The communication interface 742 may be, for example, a local area network, such as an Ethernet network, intranet, Internet, or other suitable network 744. The communication interface 742 may also be connected to an Internet service provider (ISP) 746, which may facilitate communication via the Internet 744. Any suitable commercially-available communication device or network and ISP may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

It is noted that the client device 104 (FIG. 1) and 604 (FIG. 6) may be implemented using a computer system similar to the computer system 700 in FIG. 7. The computer system that implements the client device 104, 604 may not include the HSM 750, although a similar architecture may be used to implement a password vault, for example. The client device 104, 604 may also include a client-side breach detection application, or the functions described herein for the client-side operation of the breach detection system as part of a more comprehensive security application. In example implementations, the client device may be a personal computer, a laptop computer, a tablet computer, a smartphone, or any other suitable computing device.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A non-transitory computer-implemented method for detecting breached user login data in a zero-knowledge vault, the method comprising:
receiving breached web data elements from breached data providers;
hashing the breached web data elements using a hashing method with a system key to generate breached web data hashes;
hashing the breached web data hashes using a hardware security module (HSM), where the HSM uses the hashing method with a non-exportable key to generate hashed breached web data hashes, where the HSM is a hardware component having a dedicated HSM interface with the breach detection module such that the HSM includes an HSM processor configured to execute the hashing method and HSM storage to store the non-exportable key such that access to the non-exportable key is prohibited to entities external to the HSM;
storing the hashed breached web data hashes in a hashed breached web database;
receiving at least one user login data hash and an anonymous identifier from a client device, where the at least one user login data hash corresponds to user login data elements processed on the client device using the hashing method and the system key, where no identifying information associated with a user of the client device is received;
hashing the at least one user login data hash using the HSM, where the HSM uses the hashing method and the non-exportable key stored therein to generate at least one hashed user login data hash for each user login data hash;
comparing the at least one hashed user login data hash with each of the hashed breached web data hashes;
sending a breach notification to the client device for each hashed user login data hash that matches one of the plurality of hashed breached web data hashes; and
storing the anonymous identifier and each hashed user login data hash that does not match any of the hashed breached web data hashes.

2. The method of claim 1 further comprising generating a random identifier to store with the hashed user login data hash and the anonymous identifier when the hashed user login data hash does not match any of the hashed breached web data hashes.

3. The method of claim 2 further comprising:
receiving breached web data elements;
identifying new breached web data elements;
hashing the new breached web data elements with the special key to generate new breached web data hashes;
hashing the new breached web data hashes using the non-exportable key;
storing each new hashed breached web data hash in the hashed breached web database;
comparing each hashed user login data hash corresponding to each random identifier and each of the new hashed breached web data hashes stored in the hashed breached web database;
queueing a breach alert message for each hashed user login data hash that matches one of the hashed breached web data hashes, where the breach alert message contains the random identifier.

4. The method of claim 2 further comprising:
receiving a request for information from the client device using the anonymous identifier and random identifiers;
sending the queued breach alert message for each second anonymous identifier that includes the breach alert message to the client device based on the anonymous identifier.

5. The method of claim 1 where:
in the step of receiving the breached web data elements, the breached web data elements are breached passwords and are hashed to generate breached password hashes; and
in the steps of receiving the at least one user login data hash, the at least one user login data hash comprises at least one password hash, the hashed user login data hash comprises a hashed password hash.

6. The method of claim 5 where the step of receiving the breached web data elements includes receiving breached username-password combinations and corresponding domain names and hashing the breached username-password combinations to generate breached username-password hashes, the step of hashing the breached web data hashes includes hashing the breached username-password hashes using the hashing method with the non-exportable key, the method comprising:
receiving at least one username-password combination hash from the client device, where the at least one username-password combination hash was processed on the client device using the hashing method, where no information associated with a user of the client device user is received from the client device;
hashing the at least one username-password combination hash using the hashing method and the non-exportable key to generate a hashed username-password combination hash for each username-password combination hash;
comparing each hashed username-password combination hash with each of the hashed breached username-password hashes;
sending a breach notification to the client device for each hashed username-password hash that matches one of the hashed breached username-password hashes, where the breach notification includes the domain name corresponding to the matching breached username-password combination; and
storing the anonymous identifier and each hashed username-password combination hash that does not match any of the hashed breached username-password hashes.

7. The method of claim 1 where:
in the step of receiving the breached web data elements, the breached web data elements include breached username-password combinations;
the step of hashing the breached web data hashes includes hashing the breached username-password hashes using the hashing method with the non-exportable key;
in the step of receiving the at least one user login data hash, the at least one user login data hash includes at least one username-password combination hash;
the step of hashing the at least one user login data hash includes hashing the at least one username-password combination hash.

8. The method of claim 1 where:
in the step of receiving the breached web data elements, the breached web data elements include breached usernames and hashing the breached usernames to generate breached username passwords;
the step of hashing the breached web data hashes includes hashing the breached username hashes using the hashing method with the non-exportable key;
in the step of receiving the at least one user login data hash, the at least one user login data hash includes at least one username hash;
the step of hashing the at least one user login data hash includes hashing the at least one username hash.

9. The method of claim 1 where the hashing steps include hashing using the HMAAC-SHA512 as the hashing method.

10. A system comprising:
a network interface configured to communicate with a client device and a database of web breach data;
a hardware security module (HSM) comprising an HSM storage for storing a non-exportable key such that the non-exportable key is inaccessible to entities outside of the HSM, an HSM processor configured to perform a hashing function, and a dedicated HSM interface; and
a breach detection module connected to communicate with the HSM via the dedicated HSM interface and configured to:
receive breached web data elements from breached data providers,
hash the breached web data elements using the hashing method with a system key to generate breached web data hashes,
hash the breached web data hashes in the HSM using the hashing method with the non-exportable key to generate hashed breached web data hashes,
store each hashed breached web data hash in a hashed breached web database,
receive at least one user login data hash processed on the client device using the hashing method and the system key, and an anonymous identifier from the client device, where no information associated with a user of the client device is received,
hash the at least one user login data hash in the HSM using the hashing method and the non-exportable key to generate at least one hashed user login data hash for each user login data hash,
compare the at least one hashed user login data hash with each of the hashed breached web data hashes,
send a breach notification to the client device for each hashed user login data hash that matches one of the hashed breached web data hashes, and
store the anonymous identifier and each hashed user login data hash that does not match any of the hashed breached web data hashes.

11. The system of claim 10 where the breach detection module is further configured to:
generate a random identifier to store with the hashed user login data hash and the anonymous identifier when the hashed user login data hash does not match any of the hashed breached web data hashes.

12. The system of claim 11 where the breach detection module is configured to:
repeat the step of receiving the breached web data elements, and identifying new breached web data elements;
hash the new breached web data elements using the system key to generate new breached web data hashes;
hash the new breach web data hashes using the non-exportable key in the HSM;
storing each new hashed breached web data hash in the hashed breached web database;
compare each hashed user data hash corresponding to each random identifier with each of the new hashed breached web data hashes stored in the hashed breached web database,
queue a breach alert message for each hashed user login data hash that matches one of the hashed breached web data hashes, where the breach alert message contains the random identifier.

13. The system of claim 12 where the breach detection module is configured to:

receive a request for information from the client device using the anonymous identifier and random identifiers;

send the queued breach alert message for each random identifier that includes the breach alert message to the client device based on the anonymous identifier.

14. The system of claim 10 where:

in receiving the breached web data elements, the breached web data elements are breached passwords and the breached passwords are hashed to generate breached password hashes; and in receiving the at least one user login data hash, the at least one user login data hash comprises at least one password hash, and the hashed user login data hash comprises a hashed password hash.

15. The system of claim 14 where:

the breached web data elements include breached username-password combinations and corresponding domain names where the breached username-password combinations are hashed to generate breached username-password hashes, hashing the breached web data hashes includes hashing the breached username-password hashes using the hashing method with the non-exportable key, and the breach detection module is configured to:

receive at least one username-password combination hash from the client device processed using the hashing method, where no information associated with a user of the client device user is received from the client device;

hash the at least one username-password combination hash using the hashing method and the non-exportable key to generate a hashed username-password combination hash for each username-password combination hash;

compare each hashed username-password combination hash with each of the hashed breached username-password hashes;

send a breach notification to the client device for each hashed username-password combination hash that matches one of the hashed breached username-password hashes, where the breach notification includes the domain name corresponding to the matching breached username-password combination; and store the anonymous identifier and each hashed username-password combination hash that does not match any of the hashed breached username-password combinations.

16. The system of claim 10 where:

in receiving the breached web data elements, the breached web data elements include breached username-password combinations where the breached username-password combinations are hashed to generate breached username-password hashes;

hashing the breached web data hashes includes hashing the breached username-password hashes using the hashing method with the non-exportable key;

in receiving the at least one user login data hash, the at least one user login data hash includes at least one username-password combination hash;

hashing the at least one user login data hash includes hashing the at least one username-password combination hash.

17. The system of claim 10 where:

in receiving the breached web data elements, the breached web data elements include breached usernames and the breached usernames are hashed to generate breached username hashes;

hashing the breached web data hashes includes hashing the breached username hashes using the hashing method with the non-exportable key;

in receiving the at least one user login data hash, the at least one user login data hash includes at least one username hash;

hashing the at least one user login data hash includes hashing the at least one username hash.

18. The system of claim 10 where the HSM performs the hashing method using the HMAC-SHA512 as the hashing method.

19. The system of claim 10 where the web breached data comprises dark web breached data provided by breached data providers.

* * * * *